US011492129B2

(12) United States Patent
Haynes et al.

(10) Patent No.: US 11,492,129 B2
(45) Date of Patent: Nov. 8, 2022

(54) EVACUATION SLIDE WITH SAFETY GATE READINESS INDICATOR

(71) Applicant: GOODRICH CORPORATION, Charlotte, NC (US)

(72) Inventors: Timothy C. Haynes, Prescott Valley, AZ (US); Drew Hartman, Phoenix, AZ (US); Ryan Schmidt, Gilbert, AZ (US)

(73) Assignee: Goodrich Corporation, Charlotte, NC (US)

( * ) Notice: Subject to any disclaimer, the term of this patent is extended or adjusted under 35 U.S.C. 154(b) by 442 days.

(21) Appl. No.: 16/746,219

(22) Filed: Jan. 17, 2020

(65) Prior Publication Data

US 2021/0221525 A1    Jul. 22, 2021

(51) Int. Cl.
*B64D 25/14* (2006.01)
*B64D 45/00* (2006.01)

(52) U.S. Cl.
CPC ............. *B64D 25/14* (2013.01); *B64D 45/00* (2013.01)

(58) Field of Classification Search
CPC ...................................................... B64D 25/14
See application file for complete search history.

(56) References Cited

U.S. PATENT DOCUMENTS

| 4,333,546 A * | 6/1982 | Fisher | B64D 25/14 |
| | | | 193/25 B |
| 4,846,422 A * | 7/1989 | Fisher | B64D 25/14 |
| | | | 193/25 B |
| 6,443,259 B1 * | 9/2002 | Oney | B64D 25/14 |
| | | | 182/48 |
| 9,309,002 B2 | 4/2016 | Fellmann | |
| 2015/0097083 A1 * | 4/2015 | Fellmann | B64D 9/00 |
| | | | 244/137.2 |
| 2021/0086870 A1 | 3/2021 | Haynes | |
| 2021/0094693 A1 | 4/2021 | Haynes | |

OTHER PUBLICATIONS

USPTO, Pre-Interview First Office Action dated Jul. 12, 2021 in U.S. Appl. No. 16/746,172.
USPTO, Notice of Allowance dated Sep. 1, 2021 in U.S. Appl. No. 16/746,172.

* cited by examiner

*Primary Examiner* — Philip J Bonzell
*Assistant Examiner* — Tye William Abell
(74) *Attorney, Agent, or Firm* — Snell & Wilmer L.L.P.

(57) ABSTRACT

An inflatable slide may comprise a ramp portion and a slide portion having a head end attached to the ramp portion and a toe end opposite the head end. A safety gate readiness indicator may be located between the head end of the slide portion and an entrance of the ramp portion. The safety gate readiness indicator may be configured to translate between a transverse position and an erect position.

18 Claims, 4 Drawing Sheets

EVACUATION SLIDE WITH SAFETY GATE READINESS INDICATOR

FIELD

The present disclosure relates to aircraft evacuation systems and, in particular, to a safety gate readiness indicator for an evacuation slide.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. Evacuation systems may also deploy from the side of an aircraft fuselage, for example, or from over a wing of the aircraft, i.e., "off-wing." Off-wing evacuation systems may include a readiness indicator, which indicates to evacuees whether the slide is fully deployed and/or in a position to safely covey evacuees to an exit surface. Current readiness indicators may inflate during slide inflation. However, the readiness indicators can be difficult to see and/or understand, and may be ineffective in high winds.

SUMMARY

An inflatable slide is disclosed herein. In accordance with various embodiments, the inflatable slide may comprise a ramp portion, a slide portion comprising a head end attached to the ramp portion and a toe end opposite the head end, and a safety gate readiness indicator located between the head end of the slide portion and an entrance of the ramp portion. The safety gate readiness indicator may be configured to translate between a transverse position and an erect position. In the transverse position, the safety gate readiness indicator may transverse the ramp portion. In the erect position, the safety gate readiness indicator may be generally perpendicular to a floor of the ramp portion.

In various embodiments, the safety gate readiness indicator may be inflatable. In various embodiments, the ramp portion may comprise a first hand rail and a second hand rail. In the transverse position, the safety gate readiness indicator may extend from the first hand rail to the second hand rail.

In various embodiments, a first end of the safety gate readiness indicator may be releasably coupled to the first hand rail. In various embodiments, a releasable connection may couple the first end of the safety gate readiness indicator to the first hand rail. A cable may be configured to impart a tensile force on the releasable connection.

In various embodiments, the cable may be coupled to the toe end of the slide portion. In various embodiments, the releasable connection may comprise a thread system. In various embodiments, a second end of the safety gate readiness indicator may be fixedly attached to the second hand rail.

An off-wing evacuation system is also disclosed herein. In accordance with various embodiments, the off-wing evacuation system may comprise an inflatable slide and an inflation source fluidly coupled to the inflatable slide. The inflatable slide may include a ramp portion, a slide portion comprising a head end attached to the ramp portion and a toe end opposite the head end, and a safety gate readiness indicator located between the head end of the slide portion and an entrance of the ramp portion. The safety gate readiness indicator may be configured to translate between a transverse position and an erect position. In the transverse position, the safety gate readiness indicator may transverse the ramp portion.

In various embodiments, the safety gate readiness indicator may be fluidly coupled to the ramp portion of the inflatable slide. In various embodiments, the ramp portion may comprise a first hand rail and a second hand rail. In the transverse position, the safety gate readiness indicator may extend from the first hand rail to the second hand rail.

In various embodiments, a first end of the safety gate readiness indicator may be releasably coupled to the first hand rail. In various embodiments, a releasable connection may couple the first end of the safety gate readiness indicator to the first hand rail. A cable may be configured to impart a tensile force on the releasable connection.

In various embodiments, the cable may be coupled to the toe end of the slide portion. In various embodiments, the inflatable slide may further comprise a first strap portion coupled to the first end of the safety gate readiness indicator, and a second strap portion coupled to the first hand rail. The releasable connection may releasably couple the first strap portion to the second strap portion. In various embodiments, the releasable connection may comprise a thread system.

A ramp portion of an inflatable slide is also disclosed herein. In accordance with various embodiments, the ramp portion may comprise a first hand rail, a second hand rail located opposite the first hand rail, and a safety gate readiness indicator fixedly coupled to the second hand rail. The safety gate readiness indicator may be in fluid communication with the second hand rail.

In various embodiments, an end of the safety gate readiness indicator may be releasably coupled to the first hand rail. In various embodiments, A first strap portion may be coupled to the safety gate readiness indicator. A second strap portion may be coupled to the first hand rail. A releasable connection may releasably couple the first strap portion to the second strap portion comprises a thread system.

In various embodiments, the safety gate readiness indicator may be configured to translate between a transverse position and an erect position. In the transverse position, the safety gate readiness indicator extends between the first hand rail and the second hand rail.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option.

Throughout the present disclosure, like reference numbers denote like elements. Accordingly, elements with like element numbering may be shown in the figures, but may not be necessarily repeated herein for the sake of clarity. As used herein, "proximate" refers to a direction towards or a location close and/or adjacent to the reference component.

Figure 1A:
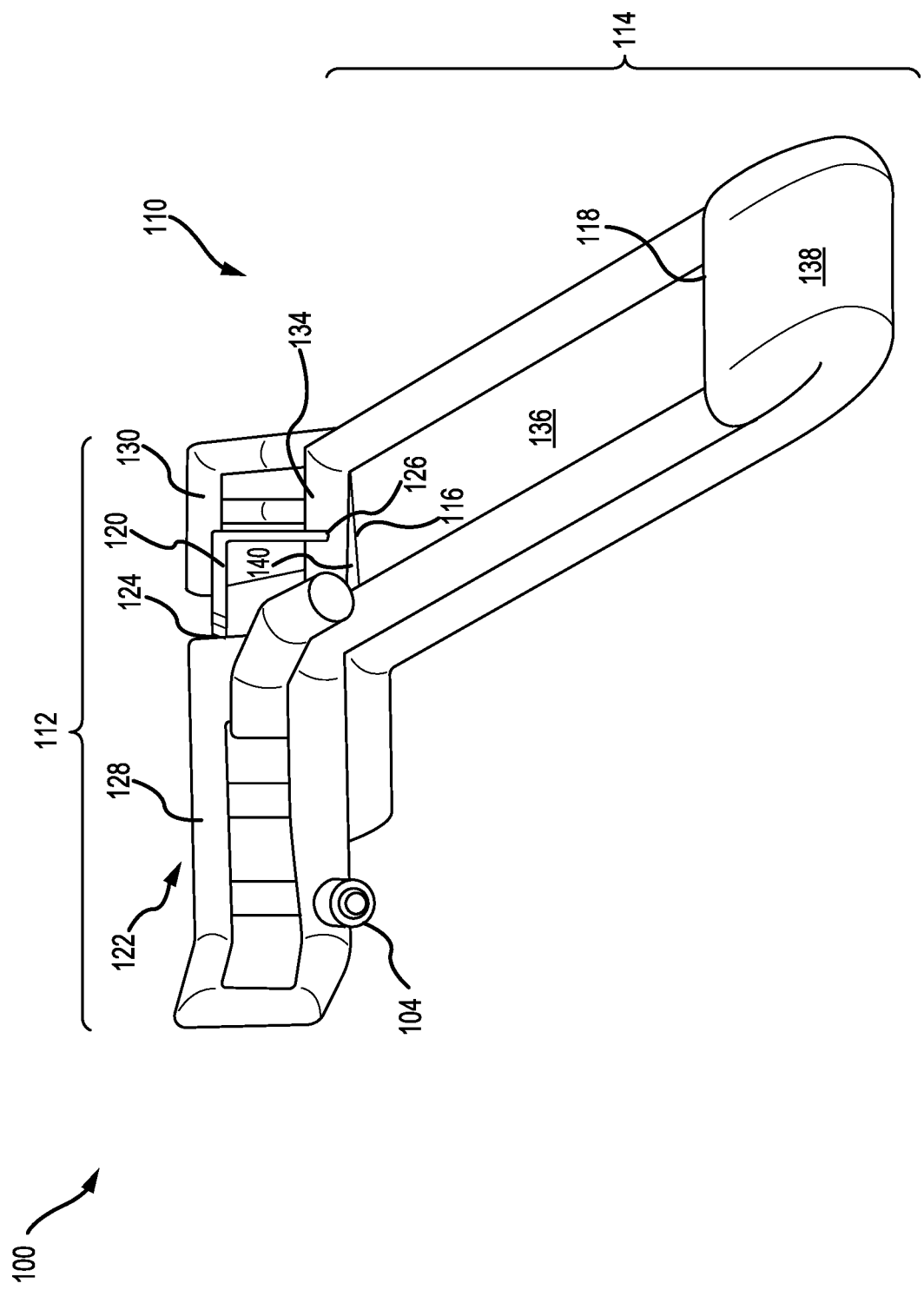
FIGS. 1A and 1B illustrate an off-wing evacuation slide in a partially deployed state with a safety gate readiness indicator in a transverse position, in accordance with various embodiments.
Figure 1B:
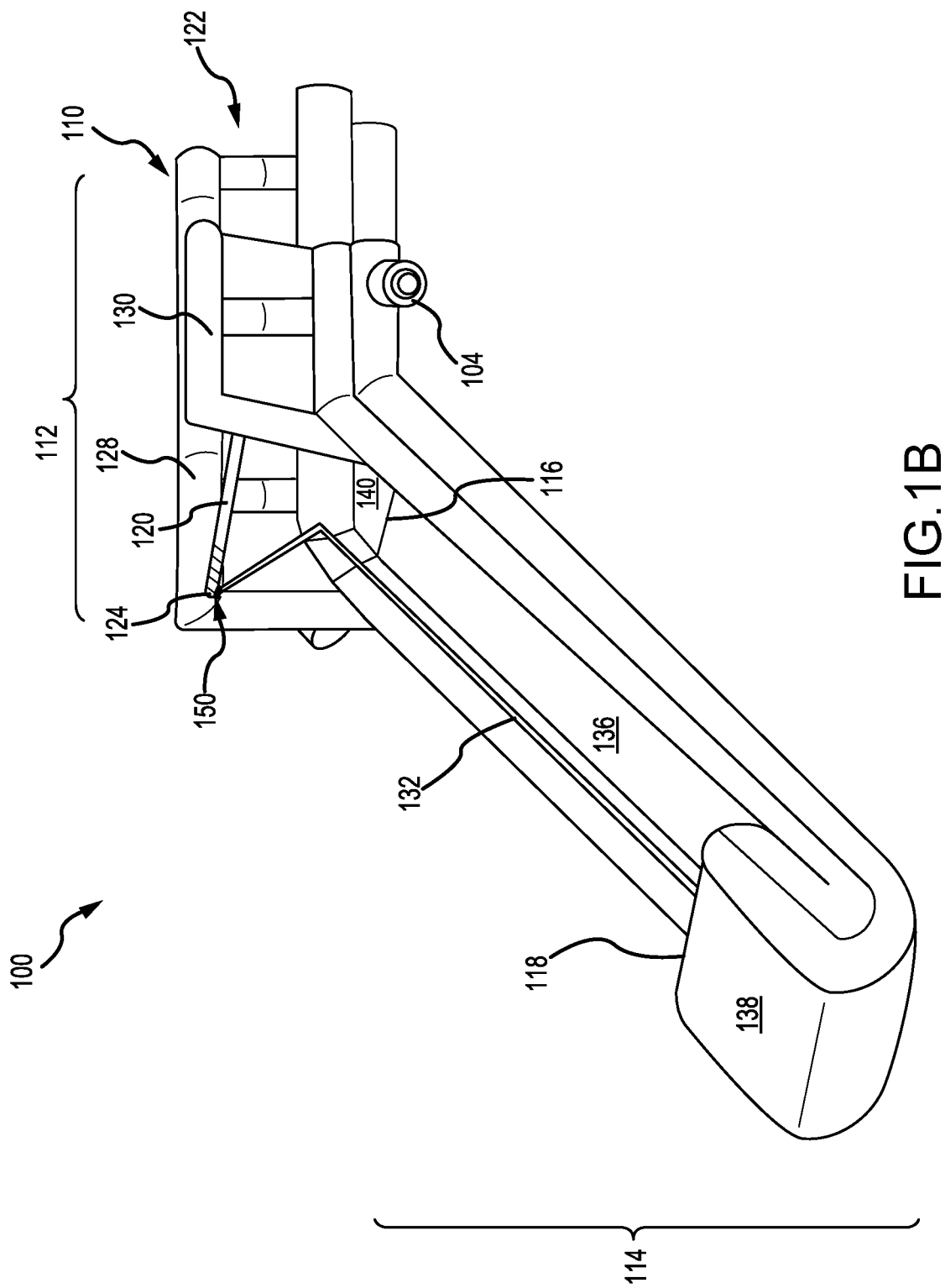

With reference to FIG. 1A, an off-wing evacuation system 100 including an inflatable slide 110 is illustrated. In FIGS. 1A and 1B, inflatable slide 110 is shown in a partially deployed state. In accordance with various embodiments, inflatable slide 110 may deploy from an aircraft. According to various embodiments, inflatable slide 110 may be used for emergency evacuation of an aircraft and may be configured to pack within a compartment of the aircraft (e.g., in an aircraft door, a slide bustle, etc.). Inflatable slide 110 may be positioned near an exit door located over a wing of the aircraft. In various embodiments, inflatable slide 110 may deploy in response to a passenger or crew member opening an exit door. In various embodiments, inflatable slide 110 may deploy in response to another action taken by a passenger or crew member such as, for example, the depression of a button, the actuation of a lever, or the like.

Off-wing evacuation system 100 may include an inflation source 104 fluidly coupled to inflatable slide 110 and configured to inflate the inflatable slide 110. Inflation source 104 may include one or more compressed fluid sources, which may include a compressed gas tank, an inflation cylinder, pyrotechnic apparatus, or other suitable inflation device. Upon deployment, inflation source 104 may deliver a pressurized fluid (such as in a gaseous state) to fill inflatable slide 110 with the pressurized fluid. In response to receiving the pressurized fluid, inflatable slide 110 may begin to inflate.

Inflatable slide 110 may comprise a ramp portion 112 and a slide portion 114. Ramp portion 112 may be secured to the aircraft, such as by a girt. Ramp portion 112 may extend across a portion of the aircraft wing to allow evacuees to walk, or traverse, across the wing and access slide portion 114 of inflatable slide 110. In this regard, evacuees may exit the aircraft door, walk across ramp portion 112, and then slide down the slide portion 114 to an exit surface.

In various embodiments, slide portion 114 may extend from ramp portion 112 and generally slope downward, toward an exit surface. Slide portion 114 may comprise a head end 116 and a toe end 118. Head end 116 of slide portion 114 may be coupled to or integral with ramp portion 112. Toe end 118 is generally opposite head end 116 and, in the fully deployed state (FIG. 3), may contact the exit surface. In FIGS. 1A and 1B, toe end 118 is partially deployed (i.e., not fully extended). In various embodiments, inflatable slide 110 may be folded when stowed. Upon deployment of inflatable slide 110, inflation source 104 may deliver pressurized fluid to inflatable slide 110, thereby causing inflatable slide 110 to unfold. It may be unsafe for evacuees to enter slide portion 114 prior to slide portion 114 fully deploying.

In accordance with various embodiments, inflatable slide 110 includes a safety gate readiness indicator 120. In FIGS. 1A and 1B, safety gate readiness indicator 120 is in a transverse, or blocking, position. In the transverse position, safety gate readiness indicator 120 transverses ramp portion 112. In the transverse position, safety gate readiness indicator 120 may extend from a first hand rail 128 to a second hand rail 130 in ramp portion 112. Safety gate readiness indicator 120 may be located between head end 116 of slide portion 114 and an entrance 122 of ramp portion 112. Entrance 122 of ramp portion 112 is located generally opposite head end 116, such that evacuees enter ramp portion 112 through entrance 122. In the transverse position, safety gate readiness indicator 120 may block evacuees from entering slide portion 114. In this regard, in the transverse position, safety gate readiness indicator 120 is configured to inform evacuees that slide portion 114 is not fully deployed and should not be entered.

In various embodiments, a first end 124 of safety gate readiness indicator 120 may be detachably coupled to ramp portion 112 of inflatable slide 110. A second end 126 of safety gate readiness indicator 120 may fixedly, or permanently, attached to ramp portion 112. In various embodiments, first end 124 of safety gate readiness indicator 120 may be detachably coupled to first hand rail 128 of ramp portion 112 and second end 126 may be fixedly, or permanently, attached to second hand rail 130 of ramp portion 112. First and second hand rails 128, 130 may be located on opposing sides of ramp portion 112. In various embodiments, safety gate readiness indicator 120 may comprise an inflatable structure. Safety gate readiness indicator 120 may be fluidly coupled to inflatable slide 110, such that safety gate readiness indicator 120 inflates simultaneously or nearly simultaneously with inflatable slide 110. For example, second end 126 of safety gate readiness indicator 120 may be in fluid communication with an inflatable rail 134 of inflatable slide 110. Inflatable rail 134 may define, at least, a portion of ramp portion 112. In various embodiments, inflatable rail 134 may extend into slide portion 114, such that inflatable rail 134 defines, at least, a portion of a sliding surface 136 of slide portion 114. Sliding surface 136 extends from head end 116 to toe end 118. Safety gate readiness indicator 120 may be in fluid communication with ramp portion 112 and/or slide portion 114.

With reference to FIG. 1B, in the transverse position, safety gate readiness indicator 120 is detachably coupled to first hand rail 128. A cable 132 may be coupled between toe end 118 and first end 124 of safety gate readiness indicator 120. Cable 132 may be configured to detach safety gate readiness indicator 120 from first hand rail 128, in response to toe end 118 translating to the fully deployed state (FIG. 3) and/or in response to an internal pressure of slide portion 114 exceeding a predetermined pressure threshold. In various embodiments, a releasable connection 150 may detachably couple cable 132 to first end 124 of safety gate readiness indicator 120.

Figure 2A:
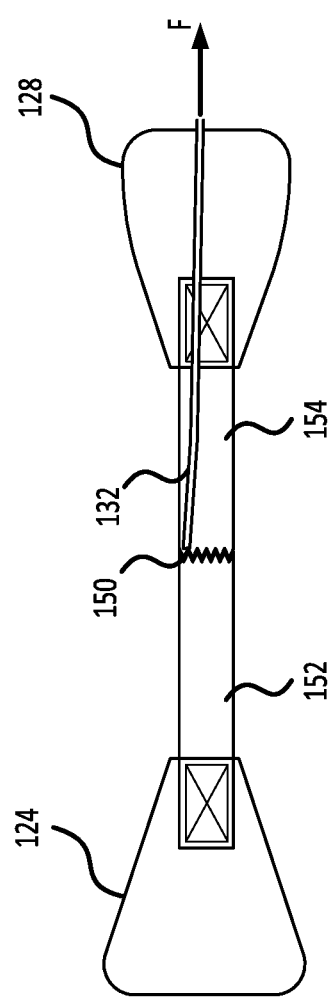
FIGS. 2A and 2B illustrate a releasable connection system for a safety gate readiness indicator, in accordance with various embodiments.
Figure 2B:
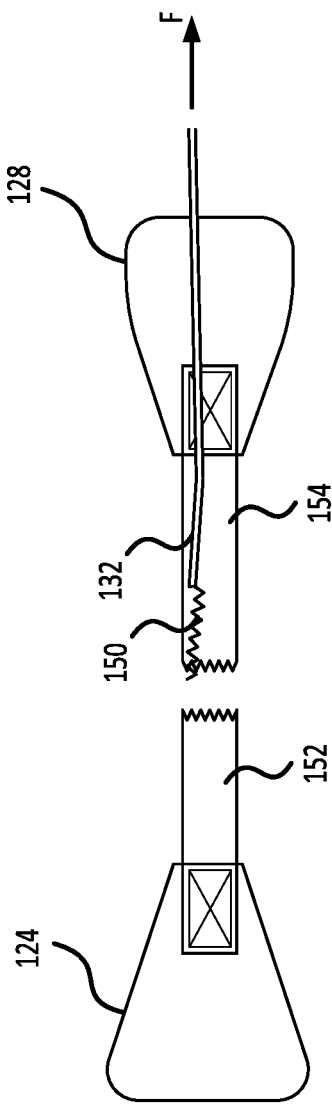

With reference to FIGS. 2A and 2B, additional details of releasable connection 150 are illustrated. Releasable connection 150 may detachably couple safety gate readiness indicator 120 to first hand rail 128. Releasable connection 150 may be configured to release, or decouple, first end 124 of safety gate readiness indicator 120 from first hand rail 128 in response to a tensile force F in cable 132 exceeding a selected threshold tensile force. The tensile force F exerted by cable 132 is generated by translation of toe end 118 to the fully deployed state (e.g., translation of toe end 118 away from head end 116 in FIG. 1B). While cable 132 is illustrated as attached to toe end 118 in FIG. 1B, it is contemplated and understood that cable 132 may be attached to other locations on inflatable slide 110. For example, cable 132 may be attached to an underside surface 138 of slide portion 114 opposite sliding surface 136 or to any location where cable 132 can impart tensile force F on releasable connection 150 as inflatable slide 110 translates to the fully deployed state.

Releasable connection 150 may releasably couple a first strap portion 152 to a second strap portion 154. Stated differently, first strap portion 152 may be releasably coupled to second strap portion 154 via releasable connection 150. First strap portion 152 may be coupled to first end 124 of safety gate readiness indicator 120. Second strap portion 154 may be coupled to first hand rail 128. In various embodiments, releasable connection 150 may comprise a thread system. While releasable connection 150 is illustrated as including thread system, it is further contemplated and understood that releasable connection 150 may comprise speed lacing, tape, snaps, hook and loop fasteners, or any other releasable fastening system.

Cable 132 may be attached to releasable connection 150 and/or configured to apply tensile force F to releasable connection 150. First strap portion 152 may separate or decouple from second strap portion 154 in response to the tensile force F applied to releasable connection 150 exceeding a threshold force. Stated differently, releasable connection 150 may disengage, or uncouple, in response to the tensile force F imparted by cable 132 onto releasable connection 150 exceeding a threshold force. In the case of a thread system, the thread system may be stitched in a manner such that the tensile force F imparted by cable 132 onto the thread system may undo and/or break the stitching of the thread system. In this regard, first end 124 of safety gate readiness indictor 120 may decouple from first hand rail 128 in response to cable 132 pulling (i.e., applying force to) the thread system.

With combined reference to FIGS. 1B, 2A, and 2B, in accordance with various embodiments, when first strap portion 152 is coupled to second strap portion 154, first end 124 of safety gate readiness indictor 120 remains proximate first hand rail 128, such that safety gate readiness indictor 120 transverses ramp portion 112 to prevent or discourage evacuees from entering slide portion 114. In response to first strap portion 152 decoupling from second strap portion 154, first end 124 may rotate away from first hand rail 128 (i.e., safety gate readiness indicator 120 may translate to the erect position), such that safety gate readiness indictor 120 does not transverse ramp portion 112.

Figure 3:
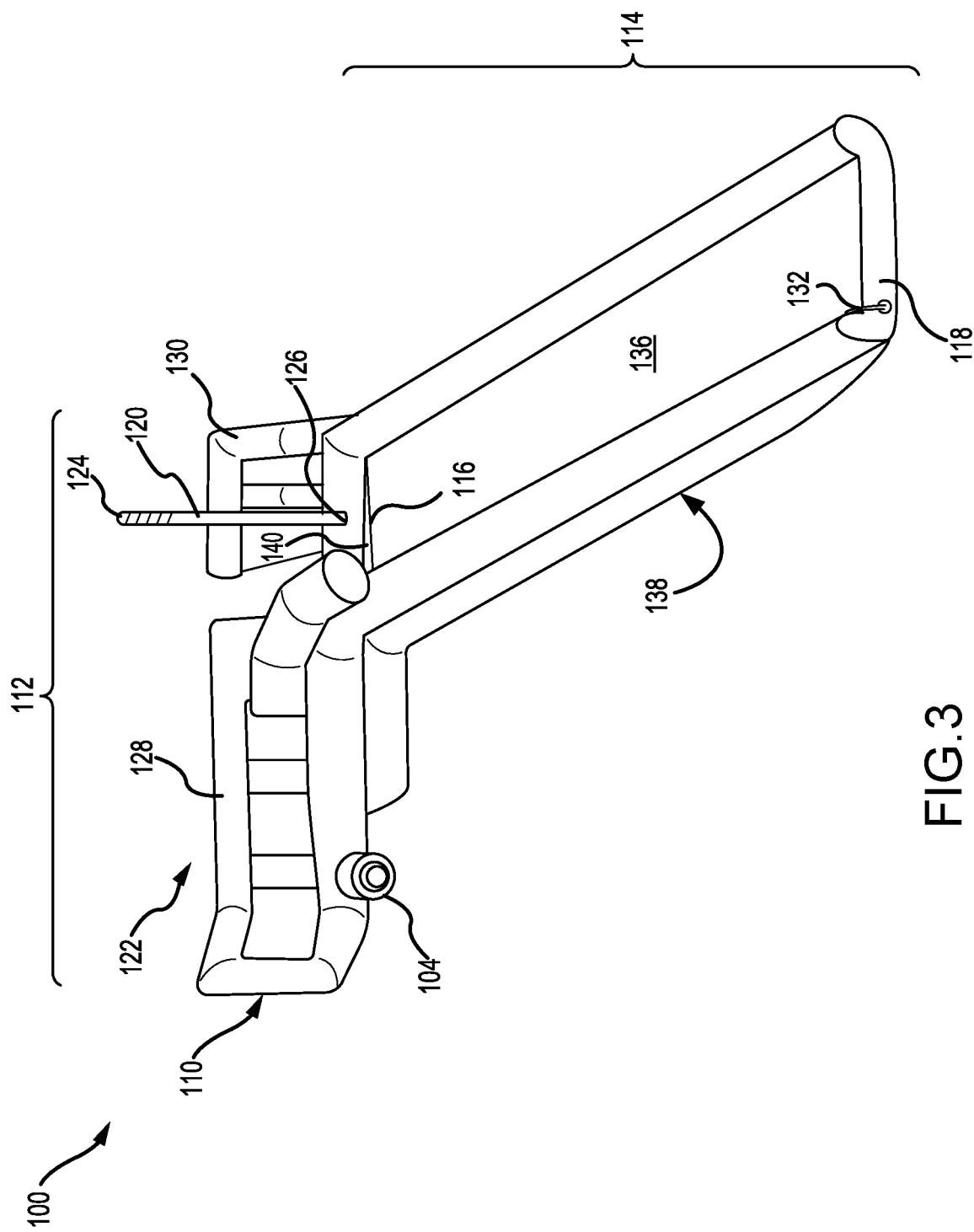
FIG. 3 illustrates an off-wing evacuation slide in a fully deployed state with a safety gate readiness indicator in the erect position, in accordance with various embodiments.

FIG. 3 illustrates slide portion 114 in the fully deployed state with safety gate readiness indicator 120 in the erect position. In the erect position, safety gate readiness indicator 120 may be generally perpendicular to a floor 140 of ramp portion 112. As used in the previous context only, "generally perpendicular" means±10° from perpendicular. Floor 140 may extend from head end 116 of slide portion 114 to entrance 122 of ramp portion 112. In various embodiments, in the erect position, safety gate readiness indicator 120 may be generally vertical. As used herein, "vertical" refers to the direction parallel to the direction of gravity, and "generally vertical" means±10° from vertical.

In the fully deployed state, toe end 118 may contact the exit surface. The exit surface may be, for example, a runway, water, uneven terrain, or other any other surface. In fully deployed state, first end 124 of safety gate readiness indicator 120 is decoupled from ramp portion 112. In various embodiments, in the erect position, first end 124 of safety gate readiness indicator 120 may extend above first and second hand rails 128, 130, such that first end 124 is visible to persons in the aircraft. In various embodiments, a marking tape may be wrapped around safety gate readiness indicator 120 proximate to first end 124. The marking tape may increase the visibility of safety gate readiness indicator 120.

In accordance with various embodiments, toe end 118 translating to the fully deployed state may decouple cable 132 and/or first hand rail 128 from first end 124 of safety gate readiness indicator 120. Decoupling first end 124 of safety gate readiness indicator 120 from first hand rail 128 allows safety gate readiness indicator 120 to translate to the erect position. In this regard, when inflatable slide 110 is in the fully deployed state, safety gate readiness indicator 120 may be located outside the path of evacuees walking on ramp portion 112. Translating safety gate readiness indicator 120 to the erect position may also allow evacuees to determine by looking from within the aircraft fuselage whether slide portion 114 is sufficiently inflated and/or fully extended such that evacuees may safely enter slide portion 114. In this regard, safety gate readiness indicator 120 is configured to indicate a deployment status of the evacuation slide (i.e., whether slide portion 114 is a position to safely evacuate passengers) and to obstruct and/or deter evacuees from entering slide portion 114 prior to inflatable slide 110 reaching full deployment and/or sufficient inflation.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable slide, comprising:
   a ramp portion;
   a slide portion comprising a head end attached to the ramp portion and a toe end opposite the head end; and
   a safety gate readiness indicator located between the head end of the slide portion and an entrance of the ramp portion, wherein the safety gate readiness indicator is configured to translate between a transverse position to block access from the ramp portion to the slide portion and an erect position to allow access from the ramp portion to the slide portion, wherein the ramp portion comprises a first hand rail and a second hand rail, and wherein in the transverse position the safety gate readiness indicator extends from the first hand rail to the second hand rail.

2. The inflatable slide of claim 1, wherein the safety gate readiness indicator is inflatable.

3. The inflatable slide of claim 1, wherein a first end of the safety gate readiness indicator is releasably coupled to the first hand rail.

4. The inflatable slide of claim 3, further comprising:
   a releasable connection coupling the first end of the safety gate readiness indicator to the first hand rail; and
   a cable configured to impart a tensile force on the releasable connection.

5. The inflatable slide of claim 4, wherein the cable is coupled to the toe end of the slide portion.

6. The inflatable slide of claim 4, wherein the releasable connection comprises a thread system.

7. The inflatable slide of claim 4, wherein a second end of the safety gate readiness indicator is fixedly attached to the second hand rail.

8. An off-wing evacuation system, comprising:
   an inflatable slide including:
   a ramp portion;
   a slide portion comprising a head end attached to the ramp portion and a toe end opposite the head end; and
   a safety gate readiness indicator located between the head end of the slide portion and an entrance of the ramp portion, wherein the safety gate readiness indicator is configured to translate between a transverse position to block access from the ramp portion to the slide portion and an erect position to allow access from the ramp portion to the slide portion, wherein the ramp portion comprises a first hand rail and a second hand rail, and wherein in the transverse position the safety pate readiness indicator extends from the first hand rail to the second hand rail; and
   an inflation source fluidly coupled to the inflatable slide.

9. The off-wing evacuation system of claim 8, wherein the safety gate readiness indicator is fluidly coupled to the ramp portion of the inflatable slide.

10. The off-wing evacuation system of claim 8, wherein a first end of the safety gate readiness indicator is releasably coupled to the first hand rail.

11. The off-wing evacuation system of claim 10, further comprising:
    a releasable connection coupling the first end of the safety gate readiness indicator to the first hand rail; and
    a cable configured to impart a tensile force on the releasable connection.

12. The off-wing evacuation system of claim 11, wherein the cable is coupled to the toe end of the slide portion.

13. The off-wing evacuation system of claim 11, wherein the inflatable slide further comprises:
    a first strap portion coupled to the first end of the safety gate readiness indicator; and
    a second strap portion coupled to the first hand rail, wherein the releasable connection releasably couples the first strap portion to the second strap portion.

14. The off-wing evacuation system of claim 13, wherein the releasable connection comprises a thread system.

15. A ramp portion of an inflatable slide, the ramp portion comprising:
    a first hand rail;
    a second hand rail located opposite the first hand rail; and
    a safety gate readiness indicator fixedly coupled to the second hand rail,
    wherein the safety gate readiness indicator is in fluid communication with the second hand rail,
    wherein the safety gate readiness indicator is configured to translate between a transverse position to block egress from the ramp portion and an erect position to allow egress from the ramp portion, and
    wherein in the transverse position the safety gate readiness indicator extends between the first hand rail and the second hand rail.

16. The ramp portion of claim 15, wherein an end of the safety gate readiness indicator is releasably coupled to the first hand rail.

17. The ramp portion of claim 16, further comprising:
    a first strap portion coupled to the safety gate readiness indicator;
    a second strap portion coupled to the first hand rail; and
    a releasable connection releasably coupling the first strap portion to the second strap portion comprises a thread system.

18. The ramp portion of claim 17,
    wherein in the erect position the safety gate readiness indicator is generally perpendicular to a floor of the ramp portion.

* * * * *